May 23, 1939.  L. M. McCLUSKEY  2,159,562
NAVIGATIONAL AND DRAFTING INSTRUMENT
Original Filed July 28, 1937    3 Sheets-Sheet 1
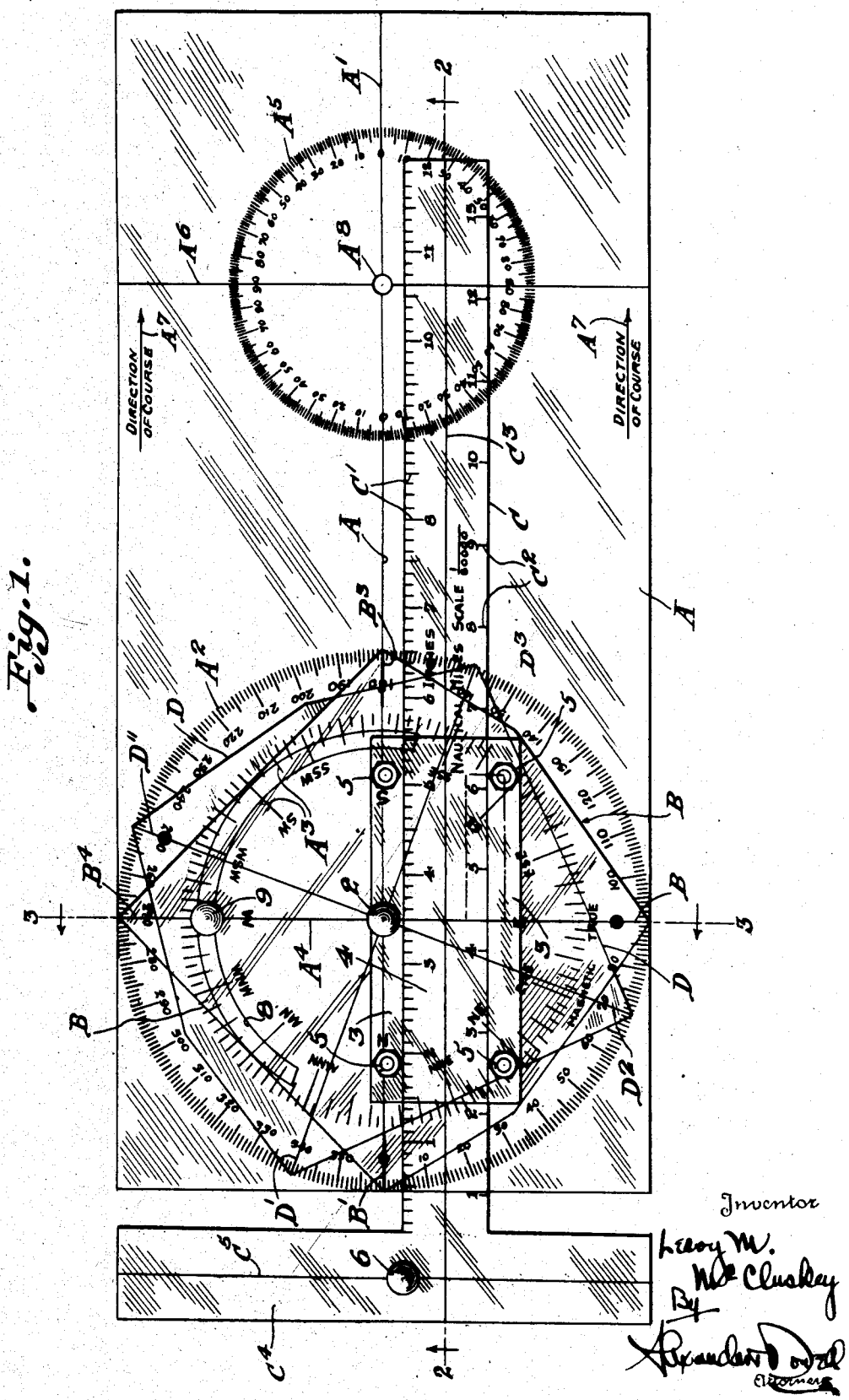

May 23, 1939.   L. M. McCLUSKEY   2,159,562
NAVIGATIONAL AND DRAFTING INSTRUMENT
Original Filed July 28, 1937   3 Sheets-Sheet 2
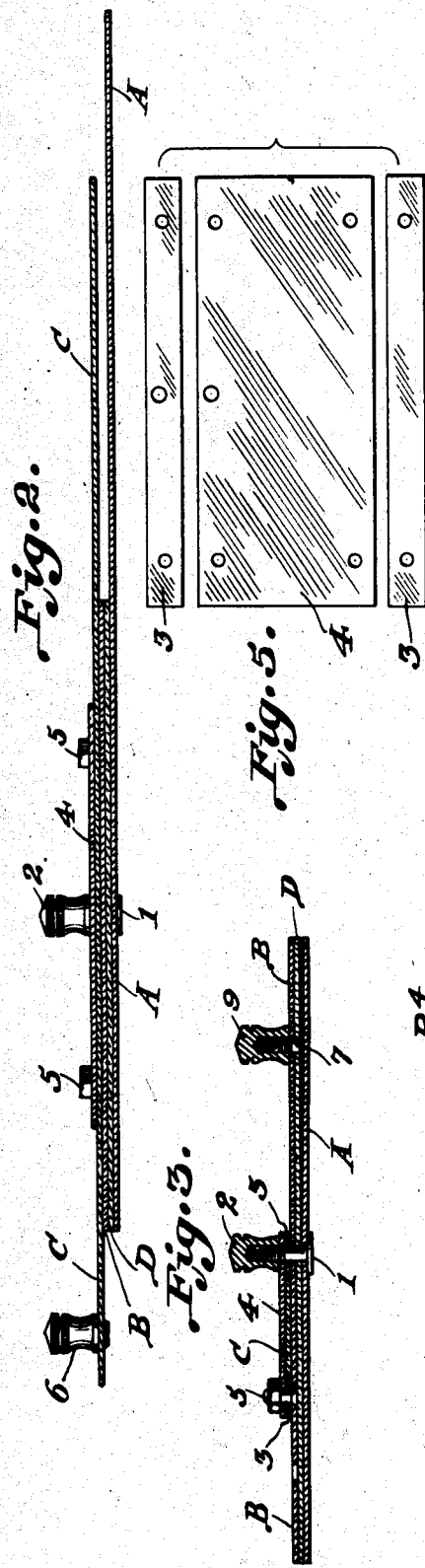
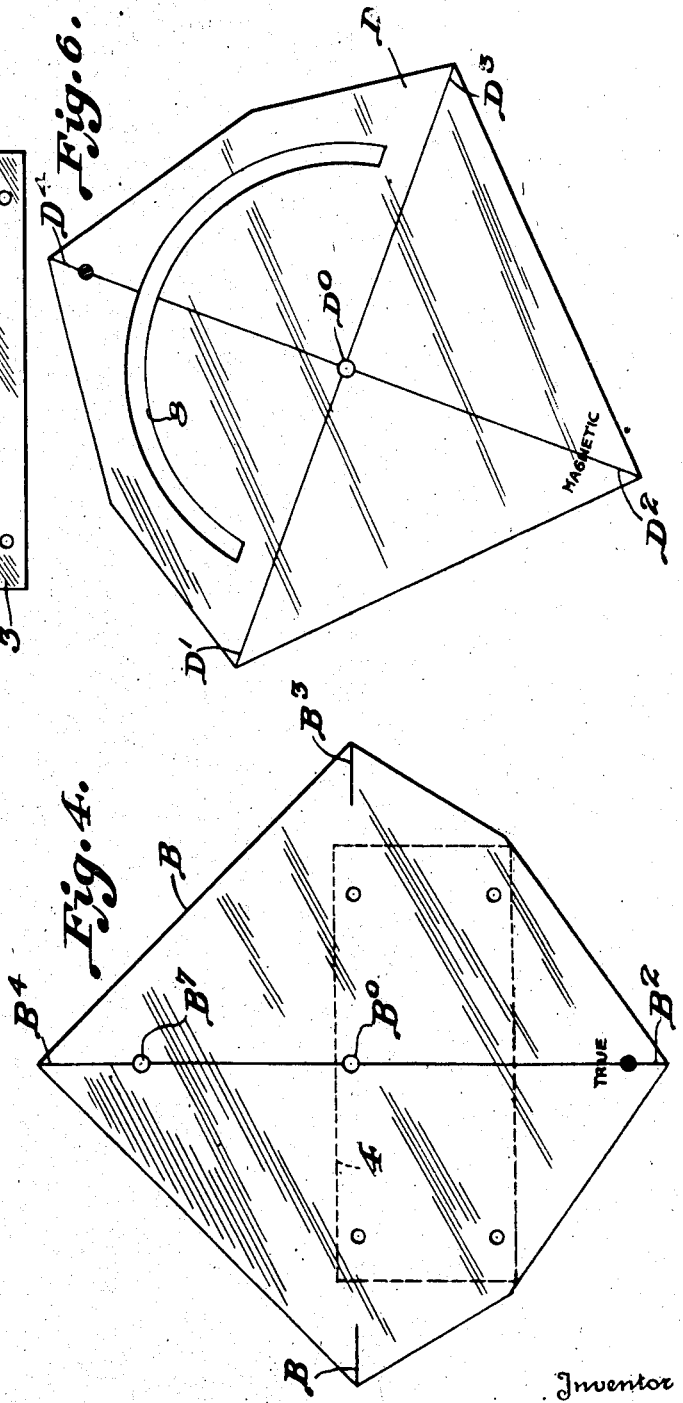
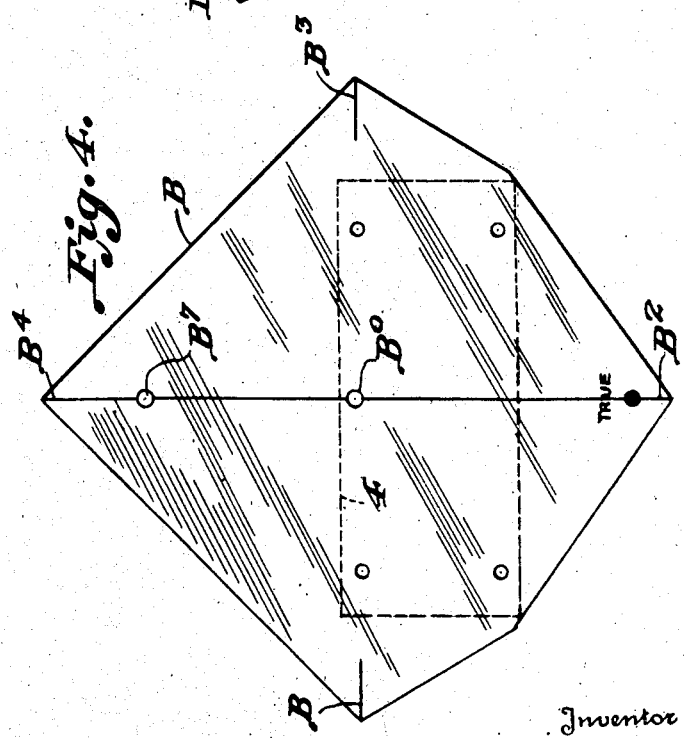

May 23, 1939.  L. M. McCLUSKEY  2,159,562

NAVIGATIONAL AND DRAFTING INSTRUMENT

Original Filed July 28, 1937   3 Sheets-Sheet 3

Inventor
Leroy M. McCluskey
By Alexander D. Dowell
Attorneys

Patented May 23, 1939

2,159,562

UNITED STATES PATENT OFFICE 2,159,562

NAVIGATIONAL AND DRAFTING INSTRUMENT

Leroy M. McCluskey, Portland, Maine

Application July 28, 1937, Serial No. 156,221
Renewed April 11, 1939

6 Claims. (Cl. 33—75)

This invention is a novel drafting instrument, particularly adapted for use in determining courses upon charts or maps between known positions, and in plotting courses in a desired direction from or to known positions, said instrument being designed to obviate undesirable features attendant to the use of instruments now generally used, such as parallel rulers and protractors, which must necessarily be moved or shifted on the chart or map to transfer the desired direction line to or from the compass rose of the chart or map which shifting operation, aside from its inherent inconvenience, usually results in unwarranted inaccuracies in the bearing calculations.

The principal object of my invention is to provide an instrument which obviates the necessity of moving or shifting same when once set upon the desired course, the instrument comprising briefly a rectangular transparent base sheet, any long edge of which can be placed on a chart along the course, said sheet having a compass rose or circle; also a substantially square transparent indicator sheet rotatably mounted on the base at the axis of the compass rose and having its four corners overlying and cooperating therewith, said indicator sheet carrying a T-square slidably mounted in guides, the head of which T-square being adapted, through rotation of the indicator sheet and axial movement of the T-square in its guides, to be brought into coincidence with any meridian of longitude either to the right or left of the base, with any parallel of latitude either above or below the base, or in fact with any lines parallel therewith such as the borderlines of the chart, while regardless of the particular setting of the T-square the same reading of the bearing will always be obtained using as an indicator the particular corner of the indicator sheet which in any position of the T-square is pointing directly towards the user, i. e., to the bottom of the chart, the reading indicating directly the particular degree or point of the bearing without reference to any compass rose which may be displayed on the chart itself, thereby rendering the instrument particularly adapted for use by aviators and small boat navigators where facilities for spreading out large portions of a chart on a table are lacking.

Another object of the invention is to provide an instrument of the above character with a second square indicator sheet carried by the first indicator sheet, same being similar in size and shape thereto and being adjustable thereon to indicate the magnetic course, as distinguished from the true course, for the particular location covered by the chart, the proper one of the four corners of the second sheet according to the setting of the T-square in the manner previously described with reference to the first sheet, indicating directly on the compass rose of the base the magnetic course, without reference to any compass rose carried by the chart.

A further object of the invention is to provide an instrument of the above type which will be useful in office, factory, school, or drafting room as a general drawing tool, same taking the place of ordinary tools such as protractors, T-squares, triangles, ruler dividers, parallel rulers, and the like.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:—

Fig. 1 is a plan view of the complete instrument.

Fig. 2 is a longitudinal section on the line 2—2, Fig. 1.

Fig. 3 is a transverse section on the line 3—3, Fig. 1.

Fig. 4 is a plan view of the "true" course indicator sheet, detached.

Fig. 5 is a plan view of the guide forming members.

Figure 6 is a plan view of the "magnetic" course indicator sheet, detached.

Figures 7, 8, 9, 10, 11, 12, 13, 14:
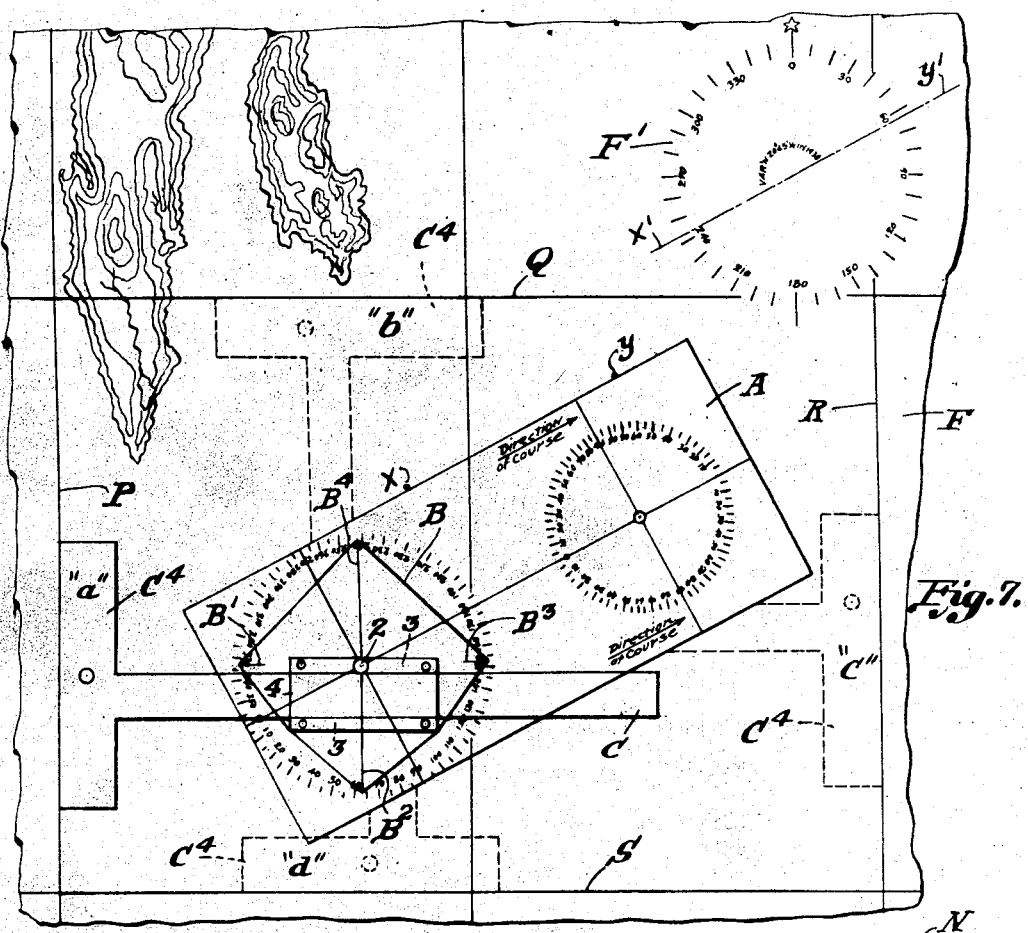
Fig. 7 is a plan view showing various applications of the instrument to a conventional chart to determine the course between two known positions.

Figs. 8 and 9 diagrammatically illustrate uses of the instrument in plotting degrees relative to the axis of the base sheet.

Fig. 10 diagrammatically illustrates another use of the instrument as a bearing taker for ships or the like.

Figs. 11, 12, 13, 14 diagrammatically illustrate various uses of the instrument for general drawing purposes.

The instrument

The instrument comprises a rectangular elongated base sheet A of transparent material, such as Celluloid, although preferably of "Lumarith"

which is stiffer, non-curling, non-inflammable, and will permit direct printing of the compass rose thereon. On the longitudinal axis of the base sheet is marked or grooved an axial line A', and at one end (left, Fig. 1) of the base, coaxial with line A', is a compass circle A² of diameter substantially equal to the width of the base. Circle A² contains three-hundred and sixty divisions reading from the 0° mark, at the adjacent end of the base, around the circle in an anti-clockwise direction, to conform with the present practice of marking compasses in degrees only. However, to facilitate use of the instrument by navigators, fishermen and pilots who still employ the former style compasses which are marked only in points, I provide within circle A² a compass rose A³ divided into 128 divisions, the north point N coinciding with the 0° mark of circle A², while the east point E, south point S, and west point W coincide respectively with the 90°, 180° and 270° marks of circle A². Preferably the customary intermediate point notations, such as "NNE", "NE", "ENE", etc., are also displayed in rose A³. Thus the provision of circle A² and rose A³ will permit the navigator to work with either degrees or points directly according to whether his compass is marked in degrees or points, thereby obviating the necessity of translating degrees into points or vice versa.

Preferably a marked or grooved line A⁴ is provided in base A normal to the line A' at the axis of circles A², A³ and passing through the 90° and 270° marks of circle A². Adjacent the other end (right, Fig. 1) of base A is a somewhat smaller circle A⁵ divided into four quadrants, the 90° marks of each quadrant coinciding with a line A⁶ normal to the line A' passing through the axis of circle A⁵. At the axis of circle A⁵ is a circular hole A⁸ for the purpose hereinafter described. On base A parallel with the long edges are arrows A⁷ pointing towards the end (right, Fig. 1) adjacent circle A⁵, and associated with each arrow is the notation "Direction of course".

In base A at the axis of compass circle A² (and rose A³) is an upstanding stud 1 (Figs. 2 and 3) carrying on its upper end a thumb nut 2 or the like, on which stud is rotatably mounted a substantially square indicator sheet B (Figs. 1 and 4) of transparent material similar to base A, said sheet B having a centrally disposed hole B⁰ for stud 1, and having marked or grooved lines B', B², B³, B⁴, respectively bisecting the angles at the four equally spaced corners, said lines when indicator sheet B is in normal position shown in Fig. 1, being adapted to overlie the 0°, 90°, 180° and 270° marks respectively of compass circle A², and consequently to also overlie the point divisions marked N, E, S, and W, respectively of compass rose A³. Indicator sheet B cooperates with the compass circle A² and rose A³ as hereinafter explained to indicate the "true" course, as distinguished from the "magnetic". The notation "True" is preferably displayed adjacent one of the corners of sheet B, as shown.

Indicator sheet B carries a fixed guide for the shank of an axially slidable T-square C of transparent material, said guide being preferably composed of spaced parallel transparent members 3, 3 (Fig. 5) mounted on the upper face of sheet B adapted to engage the side edges of the shank of T-square C, said members 3, 3 being bridged by a transparent cover member 4, (Fig. 5), the members 3 and 4 being connected together and to the sheet B by bolts or rivets 5, the shank of T-square C sliding between sheet B and top member 4. Guide 3—4 is so disposed on sheet B that the shank of T-square C will lie parallel with axial line A' when sheet B is in normal position on the base shown in Fig. 1.

The shank of T-square C has on its upper edge a marked or grooved scale C' indicating inches extending from the adjacent edge of the head C⁴; and on its lower edge a marked or grooved scale C² indicating nautical miles, said scale C² being preferably 1/80,000 to conform with that usually shown on coast and harbor charts. Scale C² extends from a line C⁵ extending longitudinally of head C⁴. In place of nautical scale C² however any scale of land miles may be substituted for use in connection with U. S. topographical charts; or any other desired scale. The shank of T-square C may also be provided with a marked or grooved axial line C³, if desired. Head C⁴ has its outer ends terminating opposite the long edges of base A when indicator sheet B is in normal position shown in Fig. 1; and said head carries a stud 6 opposite the shank whereby the T-square C may be conveniently shifted axially of its guides 3—4.

Between base A and indicator sheet B is a second substantially square indicator sheet D (Figs. 1 and 6) also of transparent material, and having a centrally disposed hole D⁰ receiving said stud 1 upon which said sheet is rotatably mounted. Sheet D is similar in size and shape to sheet B, same having marked or grooved lines D', D², D³ and D⁴ bisecting its four equally spaced corners. Sheet D is adapted to be set with respect to sheet B to indicate the "magnetic" deviation from the "true" course for the particular location covered by the chart, the sheet B being provided with a hole B⁷ for a stud 7 having its head slidable in an arcuate slot 8 of substantially 180° arcuate length in sheet D, the stud 7 carrying a thumb nut 9 or the like on its upper end. Indicator sheet D can thus be offset any number of degrees from the axis of "true" indicator sheet B. Thus, if the magnetic variation for any location is 20° westerly, the axis of sheet D is offset 20° in a clockwise direction from the axis of sheet B, while for an easterly variation the sheet D is offset in the opposite direction. Then when reading a course, sheet D will indicate directly the magnetic course without further calculation.

*In operation*

In order to determine a course between any two known positions on a chart without moving the instrument, and without reference to the chart's compass rose, either the top edge, axial line A', or bottom edge of base A may be set upon the desired course, and the base held down firmly, while T-square C is pulled out and rotated with sheets B and D on stud 1 (nut 2 being loosened) until any edge of head C⁴, or line C⁵ therein, coincides squarely with any meridian of longitude or with any parallel of latitude on the chart, or with any borderline of the chart, or any lines parallel therewith, and the course, either true or magnetic, read directly from the compass circle A² or rose A³ of the base using the particular corners of the indicator sheets B or D which in the particular setting of the T-square C is pointing directly towards the user, i. e., towards the bottom of the chart, the reading being directly obtained without further computations or calculations and without reference to the chart's compass rose.

Fig. 7 diagrammatically illustrates various applications of the instrument to a conventional chart to determine a course, chart F being shown as carrying a compass circle F' of common form. In Fig. 7 the instrument is used to determine the course, in degrees, between known points $x$ and $y$. Base A is placed on the chart with its upper edge on points $x$, $y$, and the head $C^4$ of the T-square C in position "a" has been pulled out and rotated with respect to the base (rotating with it the sheets B and D) until the outer edge of head $C^4$ coincides with a meridian of longitude to the left of the base, marked P. The corner $B^2$ of sheet B which is pointing directly to the user, i. e., towards the bottom of the chart, overlies the 63° division mark on compass circle $A^2$, directly indicating that 63° is the "true" course in degrees. If head $C^4$ of the T-square is changed into position "b" shown in Fig. 7 with its outer edge coinciding with a parallel of latitude disposed above base A, marked Q, the corner $B^3$ of indicator sheet B which in such position of the T-square is pointing to the user; i. e., towards the bottom of the chart, will also overlie the 63° mark of compass circle $A^2$, giving same course reading. If head $C^4$ of the T-square is brought into position "c" (Fig. 7) coinciding with a meridian of longitude to the right of base A, marked R, the corner $B^4$ of sheet B which is then pointing to the user, i. e., towards the bottom of the chart, will also overlie the 63° mark on compass circle $A^2$ giving the same course reading. Similarly, if the head $C^4$ is brought into position "d" so as to coincide with the parallel of latitude, marked T, disposed below base A, the corner B' of sheet B which is then pointing to the user in that position of the T-square, will also overlie the 63° mark on compass circle $A^2$. Thus the settings of the indicator sheet B in the various positions, due to the utilization of the four corners thereof, will always give corresponding readings on the compass circle $A^2$ of the base.

Obviously, instead of using the meridians of latitude and parallels of longitude, the borderlines of the chart may be utilized, affording additional lines for determination of the course where the instrument is used adjacent the corners or the borders of the chart. If the course $x$, $y$ is transferred to the compass rose F' of the chart, using parallel rulers or other means, the course would coincide with the 63° division of the chart's compass circle F, as indicated by the dotted line $x'$, $y'$ in Fig. 7. Thus in Fig. 7 the true course is read off the compass circle $A^2$ or compass rose $A^3$ of the base directly without reference to the chart's compass rose F', and it is only necessary to navigate according to the point or degree directly on the compass circle $A^2$ or compass rose $A^3$.

On the compass rose F' of chart F (Fig. 7) the magnetic variation for the particular locality is indicated as approximately 20° westerly, and thus in using the instrument on said chart, sheet D should be offset 20° in a clockwise direction with respect to sheet B so that in reading the instrument in any of the four positions "a", "b", "c", and "d" of the T-square shown, the magnetic course will be indicated as 83° when the true course is 63°.

Thus, in using my instrument, once the base is set on the course desired, same is never moved, eliminating inaccuracies occasioned by other methods necessitating shifting of parallel rulers and use of ordinary course protractors. The operator, while holding the base on the course on any part of a chart may bring the head $C^4$ of the T-square to coincide with any line of latitude or longitude near the course, or if desired even to the borders of chart, and may read directly in front of him the "true" or "magnetic" course to the exact degree without reference to the cart's compass rose, this feature enabling the operator to work on any portion of the chart even in cramped spaces such as are usually found in small boats, yachts, and airplanes; also the variation arrow can be set on the magnetic course for any given locality, and a navigator using his boat in that general locality need never change its position over a period of years; also the operator can check the course irrespective of its direction four or more different ways, eliminating former "trial" methods.

The instrument is so constructed that it can be used accurately on uneven surfaces such as are to be found on boats and airplanes; in fact it can be used on a folded chart held in one's lap, and will still give any desired course accurately, quickly, and with ease of operation.

To draw a course in any direction to or from a given point, it is only necessary to set the corner of sheets B (or D) pointing toward the user on the degree, either true or magnetic, desired, then tighten nut 2. Then the T-square is pulled out until the head $C^4$ coincides with any line of longitude or latitude, and base A adjusted until any long edge thereof passes through the given point, and then draw a line along said edge.

To plot a bearing from a given point, such as sent out by radio compass stations, or bearings from ships to known objects, simply set the corner of sheet B (or D) towards the user on the desired bearing mark of circle $A^2$ (or $A^3$) and pull out T-square C until the head coincides with any line of longitude or latitude, then manipulate base A until a long edge passes through the point, and the edge denotes the bearing.

To plot piloting bearings such as bow, beam and cross bearings, one can either use the instrument in the manner previously described, or, by removing T-square C from sheet B and by placing the head of stud 6 of head $C^4$ in the hole $A^8$ at the axis of circle $A^5$. With base A aligned with the course, any desired bearing may be obtained by sighting along the shank of the T-square. Figs. 8 and 9 illustrate use of the instrument in plotting degrees of objects such as lighthouses, buoys, etc., relative to the ship's bow or beam, using the compass circle $A^5$ and the T-square C. The head $C^4$ of T-square C is placed upon the small compass circle $A^5$ on base A with the shank sighted upon the object which may be a buoy L, the axis of base A being disposed on or parallel with the course. The rear edge of head $C^4$ of the T-square will indicate on circle $A^5$ how many degrees off bow or beam object L is, which in Fig. 8 is about 45°off port, whereas in Fig. 9 the object L is about 45° abaft the port beam.

To use the instrument as a "bearing taker" for ships, base A (Fig. 10) is disposed axially of the center line M' of the ship M or axially of the ship's compass. By sighting the shank of T-square C on any desired object, such as N, the angle from the bow or beam may be read directly upon the compass circle $A^2$ of base A, irrespective of the distance of the object from the ship. This use of the instrument is valuable in piloting a ship when a continual check is required on lights, buoys, or other objects.

To measure nautical miles between two points, place corner $B^2$ of sheet B on the 90° mark of circle $A^2$, then tighten nut 2 and pull T-square C out so that the line C⁵ of head C⁴ coincides with one point, and the line A⁴ on base A coincides with the other point, then read scale C² (1/80,000) directly below line A⁴.

To lay off long courses, place corner B² of sheet B on 90° mark of circle A² and tighten nut 2, then pull out T-square C to its end. The upper edge of head C⁴ will then be in line with a long edge of base A, and a long course may be drawn by placing marks at upper edge of head C⁴ and at the aligned edge of base A.

My instrument will be found useful in office, factory, drafting room, and school work, as a handy drawing instrument, same taking the place in many instances of T-squares, triangles, ruler dividers, parallel rulers, and protractors; also will be found useful to military offices in plotting gunning and general tactical work; also useful in working out problems in celestial navigation for mark St. Hilaire, and time sights.

Figs. 11 and 12 illustrate various uses of the instrument in connection with an ordinary draftsman's board, and serving as a general drawing tool. Fig. 11 shows a drawing board G and an ordinary T-square H. The head C⁴ of T-square C can be adjusted along ]-square H, and base A adjusted up and down upon the shank of T-square C, also adjusted to any desired angle. In Fig. 12 the base A is shown as engaging the shank of T-square H, and the T-square C of the instrument adjusted to any desired angle on the base.

Fig. 13 illustrates the use of the instrument as a combination T-square and triangle. The head C⁴ of the T-square C is placed along the edge J' of the paper J, and the instrument is manipulated independently of any other drawing tools, the base A being adjustable at any angle on the shank of the T-square, and may be moved to any position thereon.

In Fig. 14 the edge of the base A is adjusted along the edge J' of the paper J, and may be moved up and down. The T-square C may be adjusted to any desired angle, with respect to the base, and may be pulled into and out of the guide on the sheet B.

The instrument can also be used as a gauge, by placing corner B² on the 90° mark of circle A², and manipulating the T-square in and out of its guide, reading the measurements in inches (or other scale) on the shank of the T-square. The instrument can be used as a unit; or by pulling out the T-square, used as a general drawing tool, holding either the rectangular base or the head of the T-square on a base line, permitting one to draw a series of parallel lines at any angle.

I claim:

1. In an instrument of the character described, a base having a straight edge portion and bearing a compass rose; a member having a straight edge portion and having a hub rotatably mounted on the base coaxially of said rose, said hub portion having radial markings cooperating with the rose and disposed 90° apart; a second member mounted on the hub and having radial markings cooperating with the rose and disposed 90° apart, and means for adjusting the second member on the hub.

2. In an instrument of the character described, a base having a straight edge portion and bearing a compass rose; an indicator rotatably mounted on the base coaxially of said rose and having radial markings cooperating with the compass rose and disposed 90° apart; a T-square having a shank axially slidably mounted on the indicator; a second indicator member mounted on the first indicator and having radial markings cooperating with the rose and disposed 90° apart; and means for adjusting the second indicator on the first indicator.

3. In an instrument of the character described, a base having a straight edge portion and bearing a compass rose; an indicator rotatably mounted on the base coaxially of said rose and having radial markings cooperating with the compass rose and disposed 90° apart; a T-square having a shank axially slidably mounted on the indicator; one end of the head of the T-square terminating in the line of the straight edge of the base when the shank is parallel with the said straight edge.

4. In an instrument of the character described, a rectangular base having a compass rose marked with 360° divisions reading in an anti-clockwise direction around the rose, the 0° and 180° divisions being disposed on a line parallel with the long edges of the base; an indicator member rotatably mounted on the base coaxially of said rose and having radial markings cooperating with the rose and disposed 90° apart; a T-square having a shank axially slidably mounted on the indicator member; the head of the T-square being normal to the long edges of the base and the markings of the indicator member coinciding with the 0°, 90°, 180° and 270° divisions when the shank is parallel with the long edges; and means for locking the indicator member against rotation.

5. In an instrument as set forth in claim 4; a second indicator member mounted on the first indicator member and having radial markings cooperating with the rose and disposed 90° apart; and means for adjusting the second indicator member on the first indicator member.

6. In an instrument as set forth in claim 4, the outer ends of the head of the T-square terminating in the lines of the long edges of the base when the shank is parallel with said long edges.

LEROY M. McCLUSKEY.